Feb. 22, 1966  H. A. PRICE  3,236,329
MEANS FOR TRANSPORTING AND POSITIONING A WORKER
Filed July 10, 1962  8 Sheets-Sheet 1
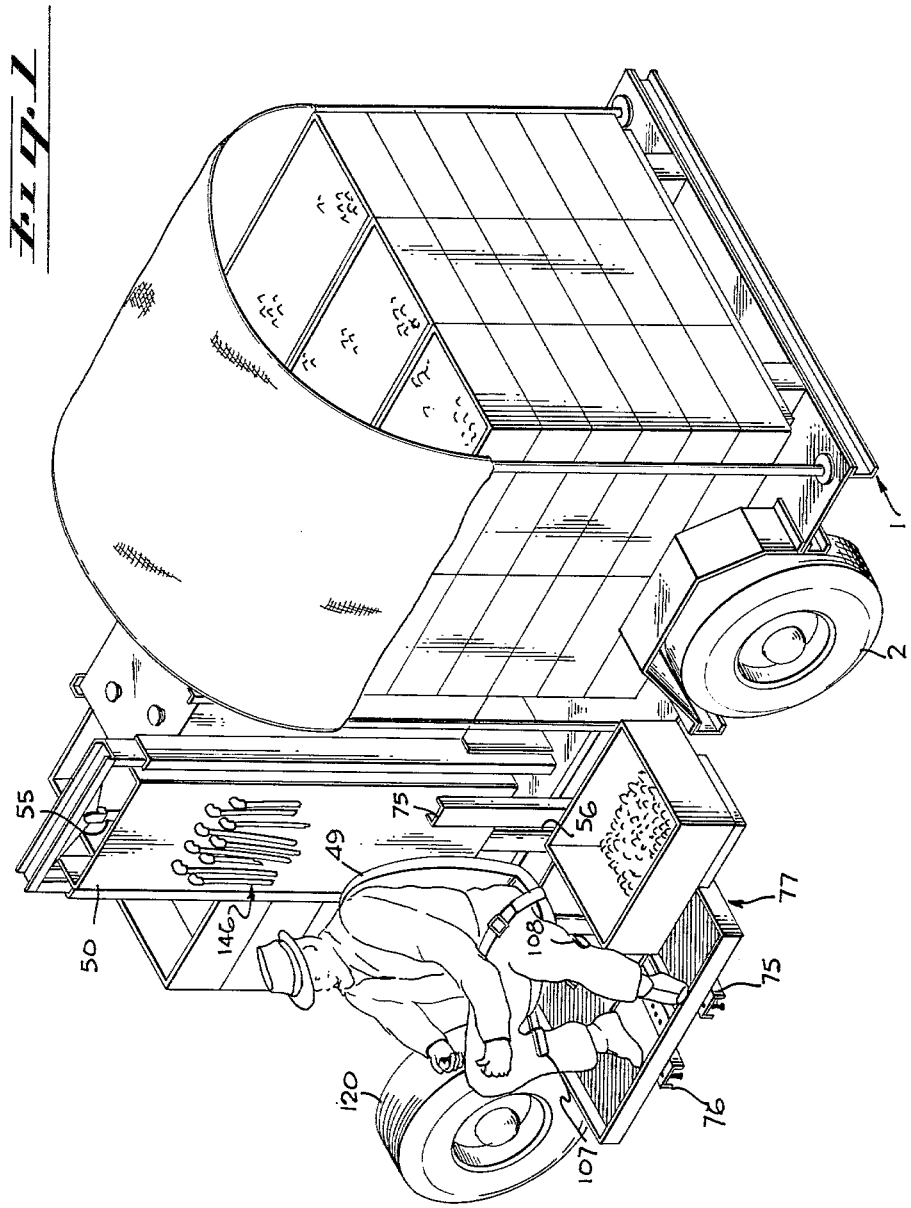
HAROLD A. PRICE
INVENTOR.
BY
Le Roy J. Leishman
AGENT

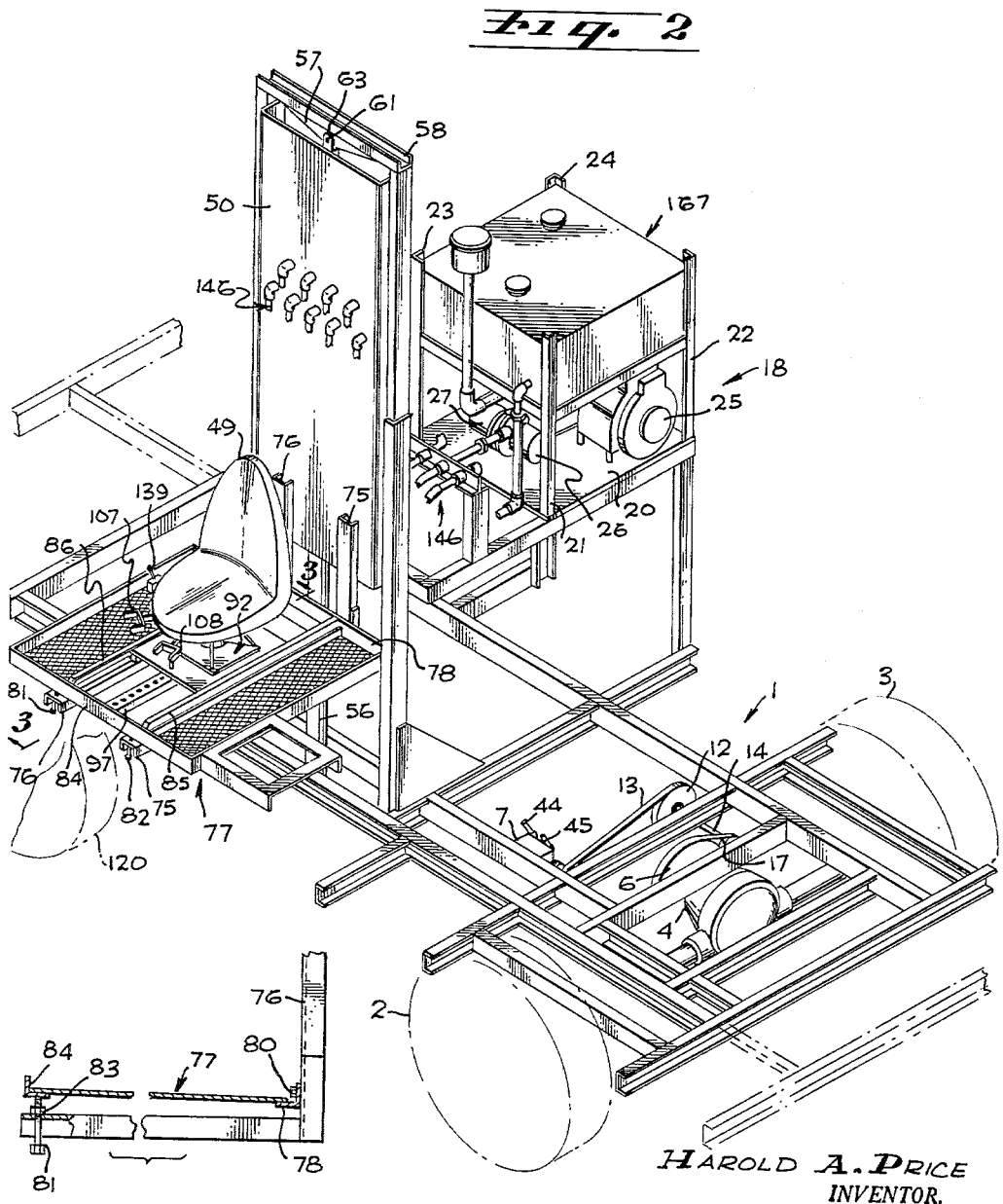

Feb. 22, 1966  H. A. PRICE  3,236,329
MEANS FOR TRANSPORTING AND POSITIONING A WORKER
Filed July 10, 1962  8 Sheets-Sheet 3
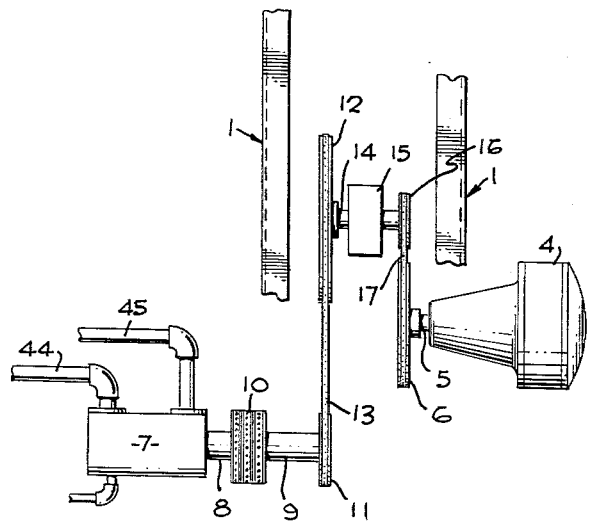
Fig. 4
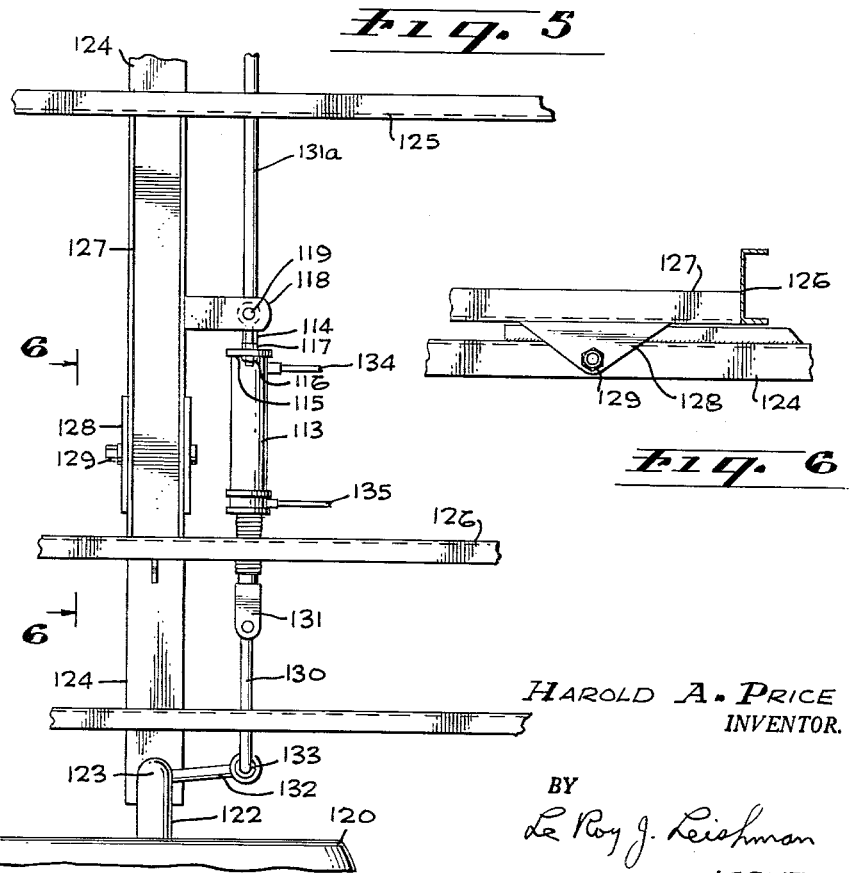
Fig. 5
Fig. 6
HAROLD A. PRICE
INVENTOR.
BY
Le Roy J. Leishman
AGENT Feb. 22, 1966  H. A. PRICE  3,236,329
MEANS FOR TRANSPORTING AND POSITIONING A WORKER
Filed July 10, 1962  8 Sheets-Sheet 4
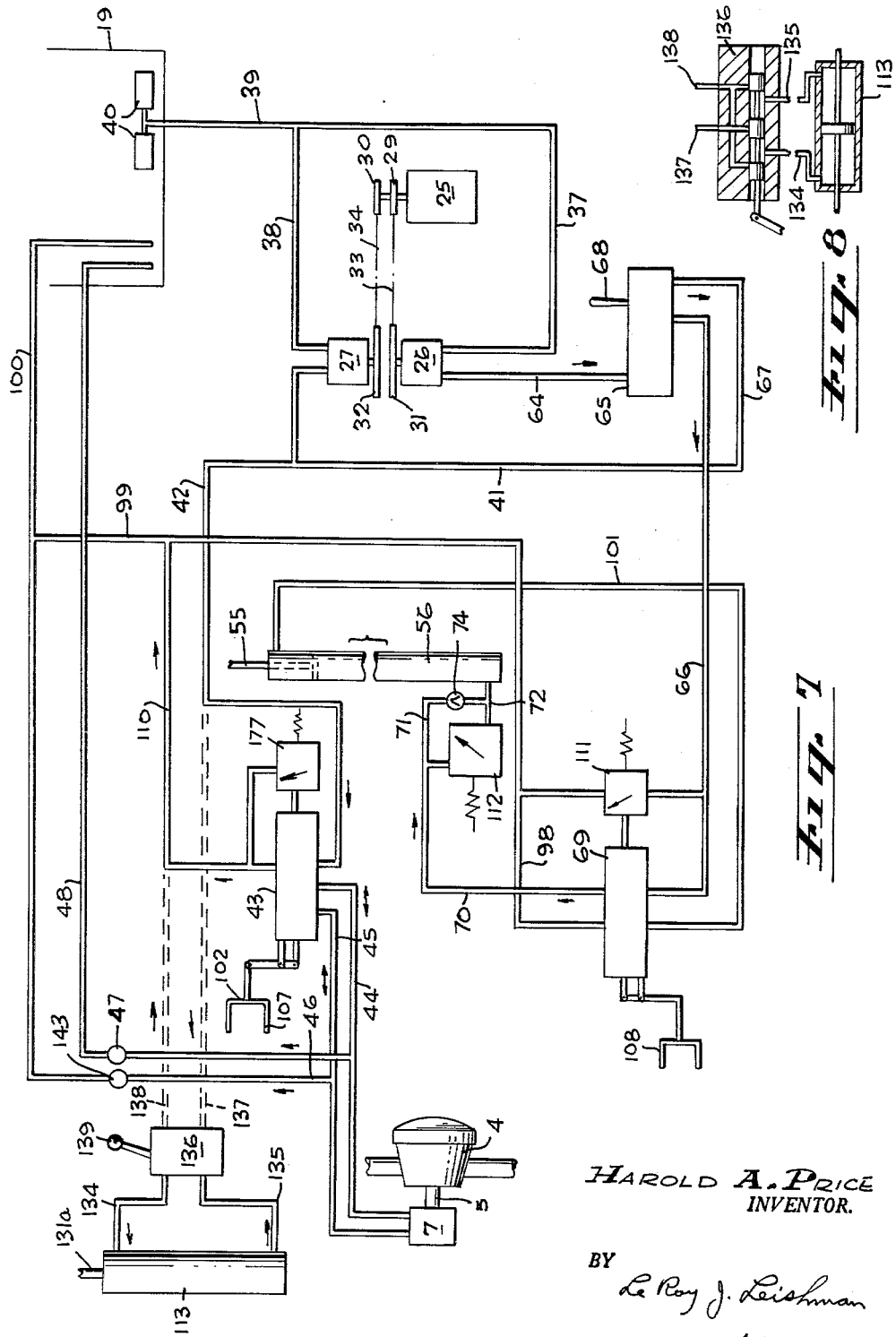
HAROLD A. PRICE
INVENTOR.
BY LeRoy J. Leishman
AGENT

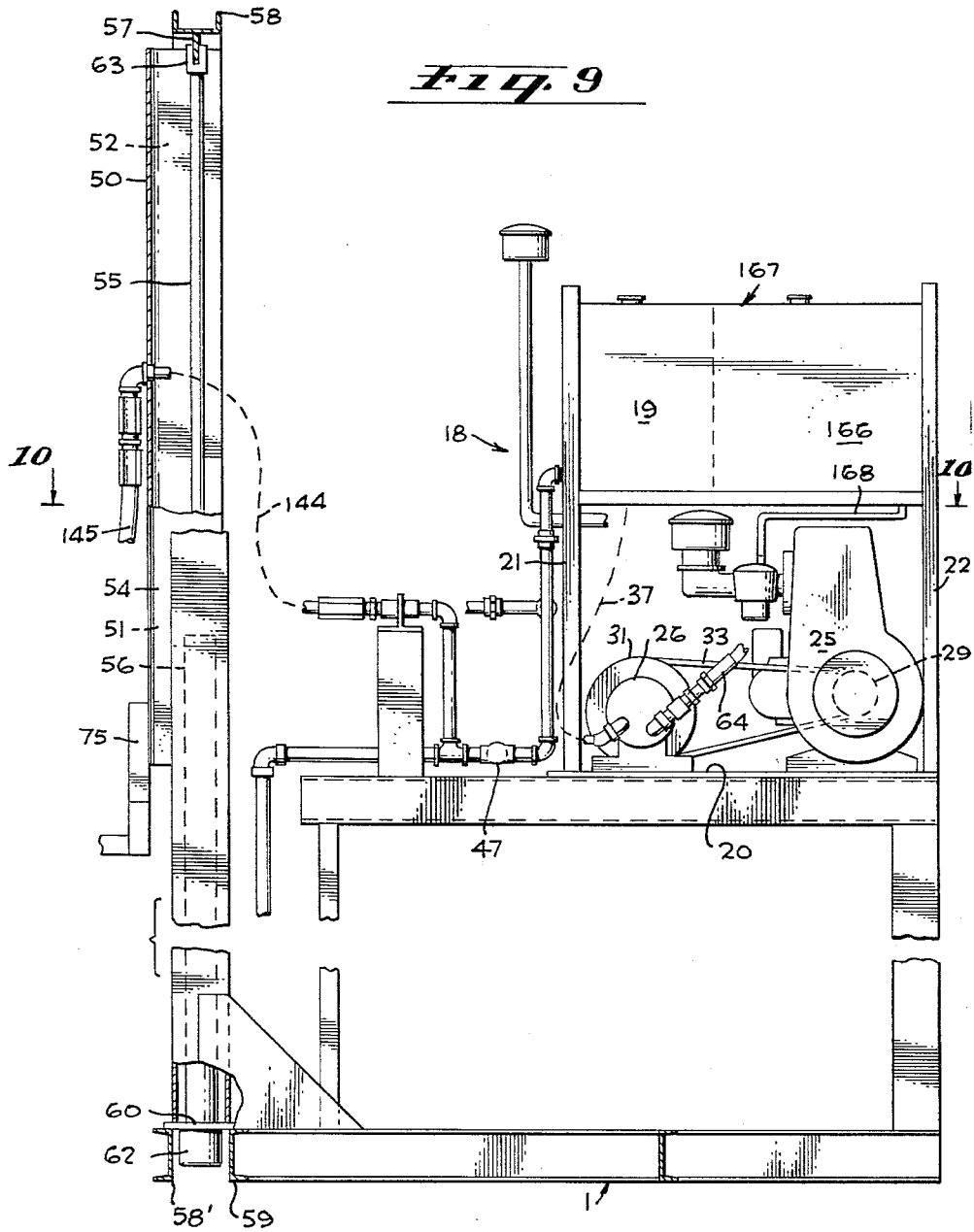

Feb. 22, 1966  H. A. PRICE  3,236,329
MEANS FOR TRANSPORTING AND POSITIONING A WORKER
Filed July 10, 1962  8 Sheets-Sheet 6
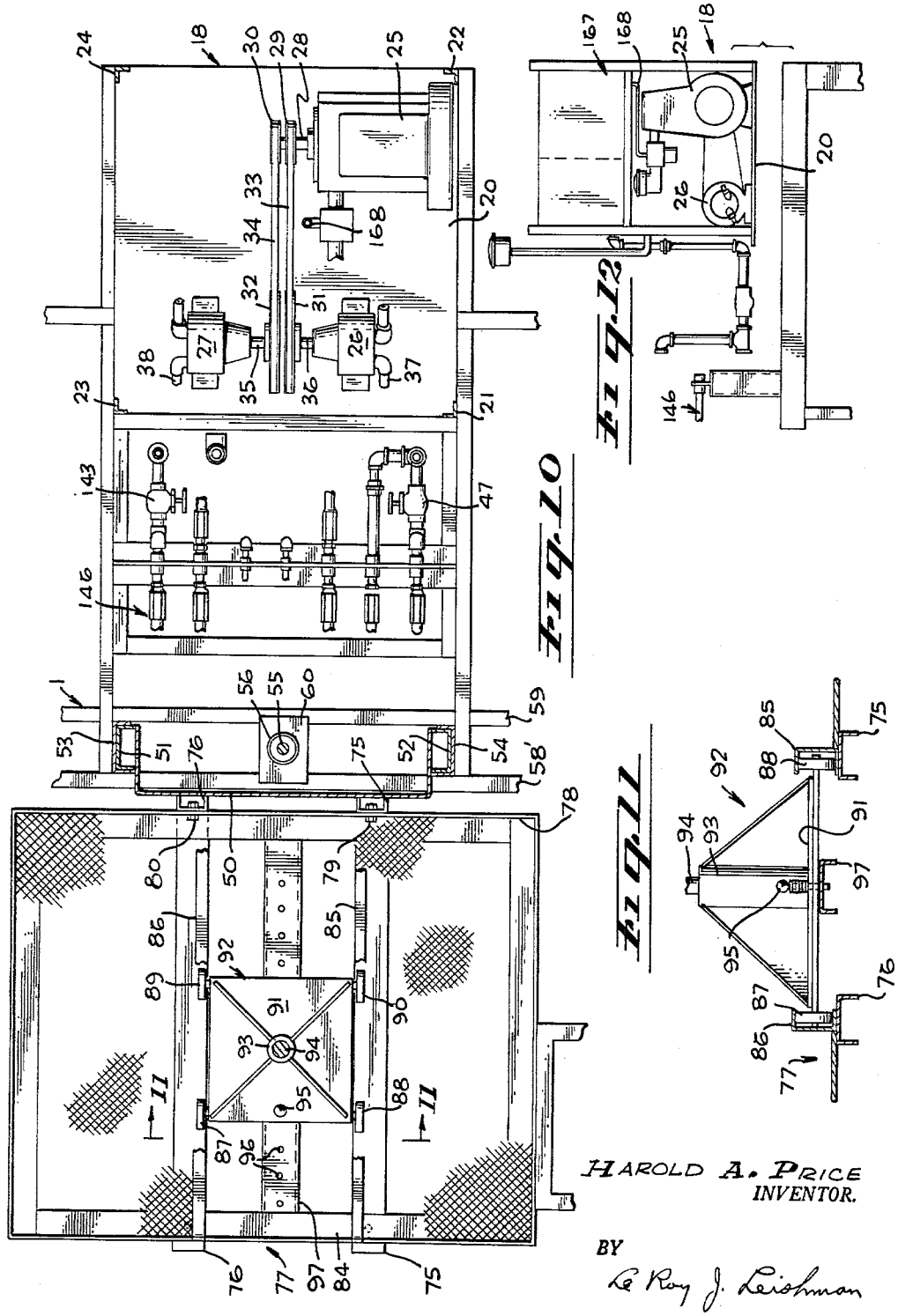
HAROLD A. PRICE
INVENTOR.
BY
Le Roy J. Leishman
AGENT

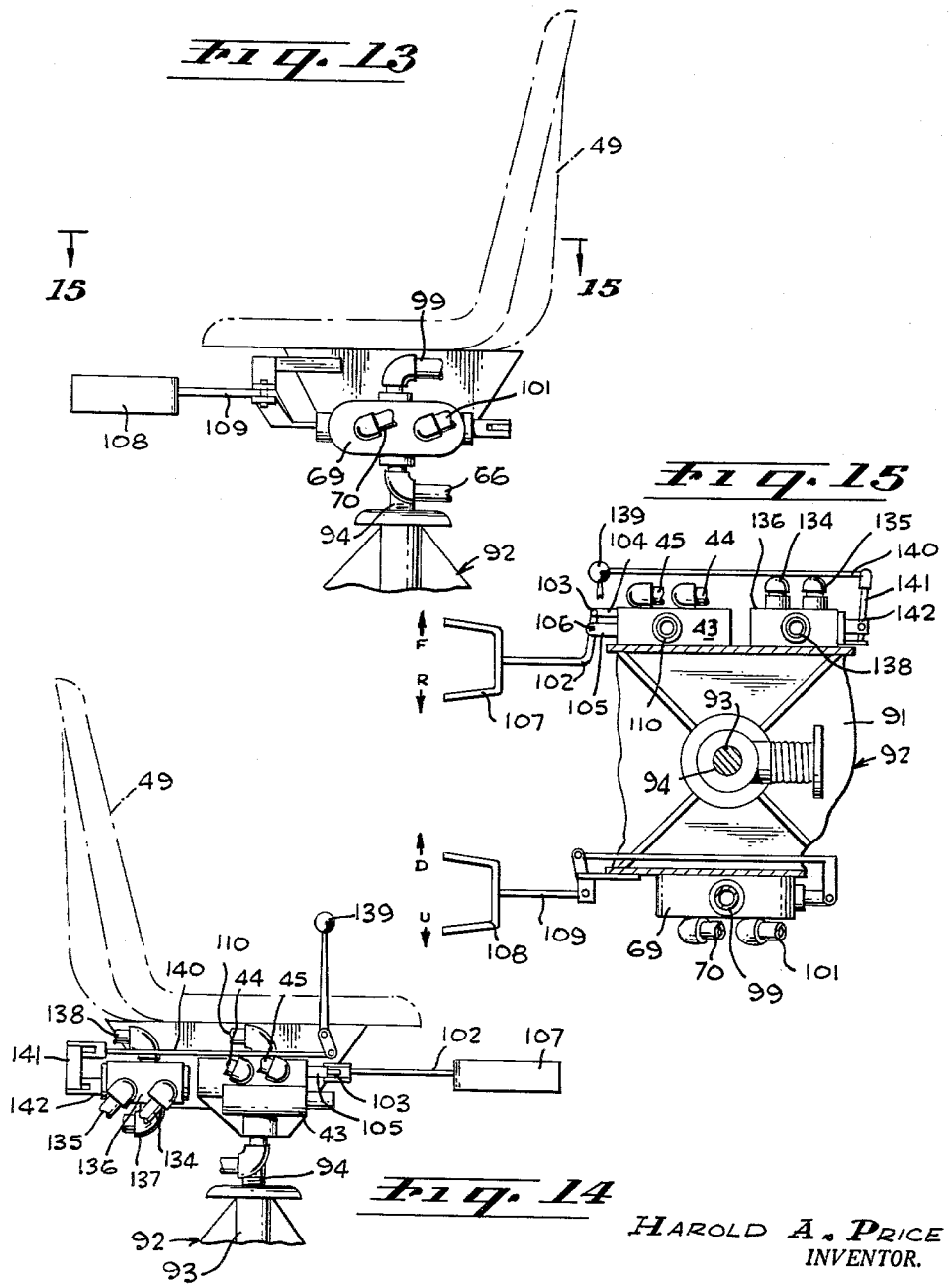

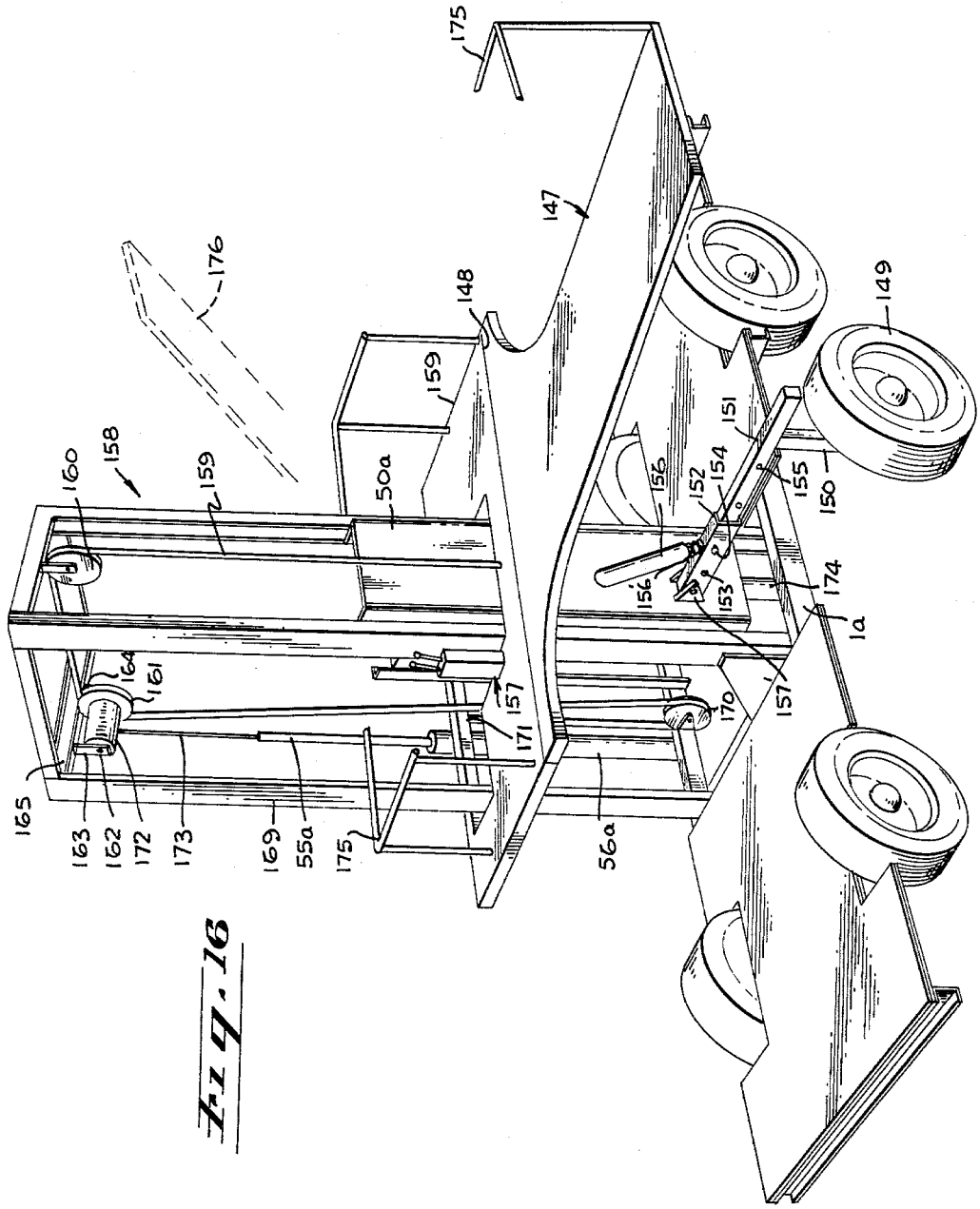

United States Patent Office 3,236,329
Patented Feb. 22, 1966

3,236,329
MEANS FOR TRANSPORTING AND
POSITIONING A WORKER
Harold A. Price, Rolling Hills, Calif., assignor, by mesne assignments, to John M. Sorenson, North Hollywood, Calif.
Filed July 10, 1962, Ser. No. 208,735
16 Claims. (Cl. 182—14)

The invention herein described pertains to powered vehicles for transporting and positioning a worker, and more particularly to a vehicle of this type that may be used to advantage by workers doing such diversified things as picking grapes from vines or fruit from trees, laying bricks or stones, or painting exterior vertical surfaces.

Workers in vineyards and orchards have heretofore had to spend an appreciable portion of their time in crawling over or under vines, climbing trees and ladders, moving buckets, baskets, crates and boxes and in moving themselves and their equipment from one portion of a vineyard or orchard to another. These auxiliary duties have kept production in many branches of farming and in particular the grape and citrus-fruit industries, from achieving the efficiency that would obviously be possible if the workers could devote their entire time and energies to the picking or pruning.

There has been a similar loss of efficiency in the construction industries, where workers have had to stand on ladders, planks or other supports to put up siding, install fixtures, build walls or paint exterior surfaces.

The invention that is the subject of this specification eliminates the loss of time consumed by the worker in moving from one spot to another, carrying equipment, climbing up and down, and it saves the worker's energies in numerous ways for the actual work to be done.

Not only does my novel vehicle transport and position the worker, but it provides a source of power to lift, lower, and haul empty containers, loaded boxes of fruit, building materials such as lumber, stone and brick, as well as the equipment that workers require for power spraying, painting, pruning and the like. It also affords a source of power for his hydraulically operated power tools.

In order to increase the efficiency in the work hereinbefore described, and in similar lines, one of the primary objects of my invention is to provide a powered vehicle that will not only carry a worker and his equipment to the exact locale of his labors but support him in a comfortable position to perform his work without having to move from the special seat or platform on the vehicle.

Another object of my invention is to provide a vehicle of the class described that will move the worker in three dimensions to various exact positions as his work progresses.

An additional object is to provide a powered vehicle that will perform the aforementioned functions under the power of a single, small, inexpensive internal combustion engine.

Another object is to provide a hydraulic power system that will propel the vehicle, raise and lower a seat or platform for the worker, move such seat or platform laterally with respect to the vehicle, and steer it by hydraulic power.

A further object is to provide a vehicle of the class described in which the power controls for the three dimensional movements will be readily accessible to the worker along with a convenient steering mechanism.

Another object is to equip such a vehicle with a seat or platform for the worker that will have great flexibility in accurately positioning the worker.

An additional object is to provide controls for the different hydraulic power cylinders that may be operated by the worker's legs and feet, thus leaving his hands and arms free for the actual physical work to be done.

Pursuant to the foregoing objects, a subsidiary object is to provide a support and seat for the worker that will have the most important controls attached thereto so that they will always be in exactly the same position with respect to the worker regardless of the elevation or angulation of the seat.

Still another object is to provide hydraulic controls mounted on the understructure of a swivel chair so that the controls will move with the worker as he shifts or pivots from side to side.

Yet another object is to provide controls for the hydraulic equipment that may be operated by side movements of the worker's legs.

Another subsidiary object to the one just mentioned is to provide a design for a control lever that will terminate in a fork or cradle into which the worker may fit a part of his leg between the knee and ankle in order to effect a simple and comfortable means of control.

A further object is to provide a simple fluid motor closely coupled to conventional differential gearing for moving the vehicle back and forth.

Another object is to so design the hydraulic controls that the mechanical slave members will be so accurately operated under power that a braking action will result whenever there is no movement of the control arms or levers.

A further object is to provide an embodiment of my invention for special use in the picking of fruit in which a vertically movable platform will extend outward from the side of the vehicle and taper toward its outer end so that the platform may be positioned between closely spaced trees, thus enabling the worker to pick fruit from adjoining sides of two different trees without any appreciable longitudinal movement of the vehicle itself.

An additional object is to provide the platform of the last mentioned embodiment with a hinged or pivoted mounting so that the platform may be folded back to a vertical position for easy movement from a position between two adjoining trees to another similar position between two other adjoining trees.

A further object is to so employ two hydraulic pumps that they may be used singly or together for varying the speed of propulsion of the vehicle, and to make them available for still other purposes in connection with the work to be done.

An additional object is to provide a hydraulic power unit for my vehicle that may be easily disconnected from its mounting on the chassis so that it may be used for other work that may be required on the farm or elsewhere.

A still further object is to so mount such hydraulic plant on the chassis that the flexible tubes and cords attached thereto may have the greatest possible flexibility.

A further object of my invention is to so locate the various components that a large amount of space is available on the vehicle for carrying lumber, crates and other supplies.

Still other objects will appear as the specification proceeds.

In the drawings:

FIG. 1 is a perspective view of one embodiment of my invention, showing a worker belted in his seat while operating one of the controls with his right hand and two others with his legs. This view shows filled crates stacked in the rear and a partially filled crate at the side of the worker.

FIG. 2 is an isometric view of the vehicle with certain parts broken away and the top portion removed in order to show structural features more clearly.

FIG. 3 is a section taken on line 3—3 of FIG. 2, showing the means for leveling the platform on which the seat is mounted.

FIG. 4 is a top view of the mechanism for driving the vehicle, including the differential, the fluid motor, a flexible coupling, and a chain and sprocket arrangement for speed reduction between the fluid motor and the differential.

FIG. 5 is a top plan view of a portion of the front of the chassis showing the power cylinder and connections for steering the vehicle.

FIG. 6 is a section taken on 6—6 of FIG. 5.

FIG. 7 is a diagram of the hydraulic system that drives the vehicle and operates the various movable elements.

FIG. 8 is a longitudinal section, partly in diagrammatic form, of a four-way valve and a slave cylinder such as those used on my vehicle for control purposes.

FIG. 9 is a view taken on line 10—10 of FIG. 2, including a side view of the fluid reservoir, power plant and certain of the hydraulic connections.

FIG. 10 is a section taken on line 10—10 of FIG. 9.

FIG. 11 is a section taken on line 11—11 of FIG. 10.

FIG. 12 illustrates the detachment of the hydraulic power unit which may be used for purposes other than powering my vehicle and its various movable elements.

FIG. 13 is a left side view of the worker's seat, showing one of the control valves and the operating lever which the worker uses to operate this valve.

FIG. 14 is a right side view of the worker's seat showing another of the valves and its control, together with the control valve for the power steering device and the lever for operating the power steering valve.

FIG. 15 is a section taken on line 15—15 of FIG. 13.

FIG. 16 is a perspective view of another embodiment of my invention, showing the platform on which the worker stands for such purposes as picking fruit from adjoining trees. This view also shows a positionable auxiliary wheel that gives the vehicle a broader base in order to keep it in balance when the worker is near the end of the platform.

As previously mentioned, my vehicle not only transports the worker and positions him in three dimensions but it also provides space for hauling empty and filled containers or for hauling such things as lumber, bricks, other building material or whatever may be required at the locale where the worker is to perform his labors. These features will be apparent from an examination of FIG. 1.

The vehicle is assembled on and around a chassis 1, as shown in FIG. 2, and as may be seen in part in several of the other figures.

Although I contemplate the embodiment of various features of my invention in vehicles that may be powered by other than hydraulic means, the embodiments chosen to illustrate my invention in this specification are both hydraulically powered.

The hydraulic system may probably best be explained in connection with one or other of the mechanisms for which the hydraulic power is used. One such mechanism is the means by which the vehicle is moved forward or backward. As shown in FIG. 2, the rear end of the chassis 1 is supported on a pair of wheels 2 and 3, preferably rubber tired. These wheels are mounted in a conventional manner and are driven by differential gearing within the housing 4, FIGS. 2, 4, and 7. The differential drive shaft 5, FIGS. 4 and 7, carries a sprocket wheel 6, FIG. 4, rigidly mounted on its outer end. In order to provide adequate clearance beneath the vehicle, this sprocket wheel should have a maximum diameter not greater than that of the differential housing 4. Sprocket wheel 6 is driven through appropriate speed reducing means by a fluid motor 7, FIGS. 4 and 7, which obtains its power from a hydraulic system about to be described. The shaft 8 of the fluid motor 7, FIG. 4, is coupled to a second shaft 9 by a flexible coupling or universal joint 10. Inasmuch as the shafts 8 and 9 revolve much faster than shaft 5 should revolve, a suitable speed reducing system must be interposed between the shafts 9 and 5, the end member of the speed reducing system illustrated in FIG. 4 comprising the previously mentioned sprocket wheel 6, as one of its components. A similar smaller sprocket wheel 11 is rigidly mounted on the shaft 9. Sprocket wheel 11 drives a larger sprocket wheel 12 by means of a chain 13, the sprocket wheel 12 being keyed or pinned on a shaft 14, FIGS. 2 and 4, suitably journaled in a bearing 15, FIG. 4, which is appropriately mounted, by means not shown, on the chassis 1. Another sprocket wheel 16, considerably smaller in diameter than sprocket wheel 12, is fixed to the opposite end of shaft 14. The toothed wheel 16 drives the larger sprocket wheel 6 by means of a second endless chain 17.

The fluid motor 7 obtains its hydraulic power from a hydraulic power plant 18, FIGS. 2, 9, 10, and 12, and the controlling and distribution system schematically shown in FIG. 7. The power plant includes a hydraulic fluid reservoir 19 and a gas tank 166, FIGS. 2, 9 and 12, in a common housing 167 spaced from a base 20 by appropriate supports 21, 22, 23 and 24. The power plant may be disconnected from the distribution system and from its mounting on the chassis, as indicated in FIG. 12, for use as an independent unit. Suitable severable connectors are accordingly provided for disconnecting and reconnecting certain of the pipes and tubes.

Within the space between the gas tank and fluid reservoir housing 167 and the base 20, I provide an internal combustion engine 25 appropriately mounted on the aforementioned base. The engine 25 receives its fuel from the gas tank 166 through the supply line 168, FIGS. 9, 10 and 12.

The engine 25 drives a pair of hydraulic pumps 26 and 27. The shaft 28 of engine 25 has rigidly mounted thereon a pair of sheaves 29 and 30 which drive the sheaves 31 and 32 respectively by means of the flexible toothed belts 33 and 34. Sheave 32 is rigidly affixed to shaft 35 of a hydraulic pump 27, FIG. 10, and sheave 31 is similarly attached to shaft 36 of the hydraulic pump 26. These two pumps receive their fluid via tubes 37, 38 and 39, FIG. 7, and the filters 40 which are interposed between the reservoir and these tubes that supply the hydraulic fluid to the pumps.

Hydraulic pump 27 supplies fluid under pressure to drive the fluid motor 7. This fluid is conveyed through tubes 41 and 42 to the valves 43 from whence the fluid passes through tube 44 to the fluid motor that drives the differential which is operatively connected to the rear wheels 2 and 3. The manner of operation of valve 43 as well as the function of the fluid pump 26 will be explained after the means for raising and lowering the worker above the chassis have been described. Suffice it to say here that the fluid that has passed through the motor 7 returns by way of tubes 45 and 46, the shut-off valve 47 and tube 48 to the fluid reservoir 19.

The worker's seat 49, FIGS. 1, 2, 13 and 14, is carried by appropriate intervening instrumentalities upon a vertically disposed and vertically movable back member or panel 50, FIGS. 1, 2, 9 and 10.

I prefer to form the panel member 50 as a box-like structure as indicated in cross section in FIG. 10. The integral side pieces 51 and 52 of this box panel assembly are slidably mounted in ways 53 and 54 which are suitably lubricated. The panel box 50 is raised by means of the plunger or ram 55 of the lift cylinder 56, FIG. 9, which rests in a flanged cup 62 whose flange 60 rests on and integrally joins the channel beams 58' and 59 of the chassis frame.

A forked member 63 is welded or otherwise suitably attached to the top end of the plunger or ram 55, and a tongue 57 integrally connected to the cross member 58 is pivoted within the forked member 56 by means of an appropriate pin 61, FIG. 2.

The plunger 55 that lifts the box assembly 50 and chair 49 which is carried thereby, is moved upward by means of fluid received under pressure from the fluid pump 26. Fluid from this pump passes through tube 64, FIGS. 7 and 9, into the directional control valve 65 where the fluid is directed either into tube 66 for operation of the lift cylinder 56 or into tube 67 in accordance with the position of the control lever 68. When the control arm 68 is set for directing the fluid from pump 26 into tube 67, the fluid from tube 67 combines with the flow stream from pump 27 to provide greater speed of the fluid motor 7 to increase the forward or backward speed of the vehicle. This optional use of the fluid from pump 26 either for speeding up the fluid motor 7 or lifting the ram 55 of the lift cylinder 56, is permissible because of the fact that it is seldom necessary to raise the plunger 55 for elevating the seat 49 while the vehicle is in motion.

When fluid from the hydraulic pump 26 is directed by means of the directional control valve 65 into conduit 66, it proceeds to the four-way directional control valve 69 where it may be directed by means later to be described into the lower end of the lift cylinder 56. The fluid reaches the lower end of this cylinder through tubes 70, 71 and 72 via the check valve 74, which provides free flow into the bottom of cylinder 56 but shuts off any reverse flow that might take place under the weight that is carried on the plunger or ram 55 in the event that valve 69 should fail. The operation of valves 43 and 69 will be explained in connection with a discussion of the controls associated with seat 49 for operation by the worker occupying the seat.

As before mentioned, the seat 49 is connected by intermediate instrumentalities to the vertically movable box structure 50. A pair of L-shaped brackets 75 and 76, FIGS. 1, 2, 9 and 10 are welded or otherwise rigidly attached to the box member 50. The platform 77, which may conveniently comprise a tray-like frame, FIG. 10, whose back member 78 is attached as by bolts 79 and 80 to the vertical portions of brackets 75 and 76, is disposed generally over the horizontal portions of these brackets. In order to level the platform, I use a pair of adjusting bolts 81 and 82, FIGS. 2 and 3, which are preferably threaded through the wide intermediate portions of the U-channels that form the brackets 75 and 76. To provide more threads for these bolts, I weld a nut 83 to the top surface of the channel that forms the respective brackets 75 and 76 as indicated in FIG. 3. The angle member 84 that forms the front side of the platform 77, rests upon the top ends of the adjusting bolts 81 and 82. The front of the platform 77 may of course be raised and lowered merely by turning the adjusting screws 81 and 82. There is enough flexibility in the connection of the back member 78 to the vertical portions of members 75 and 76 to permit the small amount of movement required at this end of the frame as the front part is being raised or lowered.

A pair of channels 85 and 86, FIGS. 10 and 11, extend from the back to the front of frame 77, and these channels are so welded to the frame or platform that their open sides face each other with their long intermediate sides disposed vertically. These channels act as ways or tracks for the four wheels 87, 88, 89 and 90 that carry the bottom plate 91 of the pedestal 92 of the seat 49 which I prefer to mount pivotally. The pedestal 92 comprises a central vertical member 93 that is internally threaded to receive the threaded supporting shaft 94 of the seat.

The worker may move his seat back or forth on the four wheels 87, 88, 89 and 90 merely by the way he moves his legs, as will be clear from FIG. 1. When it is advisable that the seat be held rigidly in position, it may be locked in any of a variety of locations along its travel by means of the spring-loaded pin 95, FIGS. 10 and 11, which may be slipped in any of the holes 96 in the elongated member 97 that extends from the back member 78 of the frame or support to its front member 84.

In the embodiment of my invention that I presently prefer, I mount the various controls for the vehicle upon the under portion of the seat. The controls for moving the vehicle forward or backward and for raising and lowering the platform 77 are both so mounted on the under structure of the seat, and if the steering is hydraulically powered, I also prefer to mount the steering control valve in the same general location.

The four-way control valve 43 for moving the vehicle forward or in reverse or applying a braking action is mounted under the right side of the seat, and the control valve 69 for raising and lowering the seat is mounted beneath the seat on the left side, the general locations of the mountings being as shown in FIGS. 13, 14 and 15. When the vehicle is to be propelled and steered under its own power, rather than towed, all possible return flow to the reservoir through tubes 46 and 48 is cut off by valves 47 and 143 respectively.

The forked lever 102, FIGS. 14 and 15, actuates the four-way valve 43 for the vehicle's forward and reverse drives. This lever is pivoted at 103 on a bracket 104 attached to the valve housing. The plunger 105 of the four-way control valve 43 is pivotally attached at 106 to the lever 102. If this type of control is used, the worker sits with the lower portion of his right leg resting in the forked end or cradle 107 of lever 102, FIGS. 14 and 15, in the manner illustrated in FIG. 1. If he moves his leg to the right, the fluid entering the four-way valve 43 from the bottom side thereof as shown diagrammatically in FIG. 7 will leave through tube 45, where it will pass through the fluid motor 7 and return through tube 44 in a reverse direction. The fluid then again passes through the valve from whence it will flow through tubes 110, 99 and 100 to the fluid reservoir 19. Valve 43 is provided with an adjustable pressure relief valve 177. If the worker moves his leg to the left, which will be toward the rear of the vehicle, the flow through the valve will be in a reverse direction and the vehicle accordingly be propelled backwards.

If he holds his leg in a central position the fluid will be prevented from flowing in either direction and the motor will stop, thus braking the vehicle to a stop. The valve action that effects this may be explained by referring to FIG. 8, which is described in the brief descriptions of the various figures as "a four-way valve and a slave cylinder such as those used in my vehicle for control purposes." Valves 43, 69 and 136 are all of this type, and a description of the valve shown in FIG. 8, though designated as valve 136, will therefore serve as an explanation of the functions of all three.

When the four-way valve is in the central position shown in FIG. 8, it will be observed that the port communicating with tube 137 and the two ports communicating with tube 138 are all three closed. Consequently the flow of fluid from the fluid motor or to the reservoir is shut off and no fluid can enter or leave the slave cylinder through the tubes 134 and 135. The central plunger is therefore immobilized in a central position with the fluid trapped on opposite sides thereof. When valve 43 is in its central position, no fluid can flow in either direction to the motor 7, and the vehicle is effectively braked; when valve 69 is in its central position, its slave cylinder 56 holds the plunger 55 and the structure positively connected thereto against moving either up or down; and when valve 136 prevents the flow of fluid into or out of the slave cylinder 113, the immobilized plunger 131a holds the vehicle on a straight course.

If the vehicle is to be towed from one location to another, the valves 47 and 143 are opened to render the four-way valve 136 non-effective by permitting the fluid to flow freely to the reservoir as it is forced from one end or other of the power steering cylinder 113 by the right or left movement of the front wheels.

The platform 77 and the seat 49 mounted thereon may be raised and lowered by means of a similar control valve 69, FIGS. 7, 13 and 15, shown mounted under the left portion of the seat. If the worker wants the platform to move upward, he moves the forked lever 109 to the left by pivoting his left leg, the lower portion of which will be positioned within the cradle 108 of the lever 109. This actuates the connected linkage indicated in FIG. 15 and causes the power-driven fluid entering the valve from tube 66, FIGS. 7 and 13, to leave the valve through tube 70, from whence it will flow through the directional check valve 74 into the lower end of the cylinder, thus lifting the plunger and the box panel 50 together with the platform 77 and seat 49 which are mounted thereon.

The four-way control valve 69 embodies an interconnected relief valve 111, preferably adjusted to 500 pounds, the location of these valves within the hydraulic system being indicated in FIG. 7. The oneway valve 74 associated with the lift cylinder 56 prevents the plunger 55 from moving down under the weight of the various parts attached thereto. Valve 74 does this by blocking the movement of fluid from the bottom of the cylinder excepting when the pressure exceeds that to which the relief valve 112 has been adjusted.

If the vehicle is to be equipped with power steering, a steering cylinder 113, FIGS. 5 and 7, is provided. This cylinder is connected to the chassis in the manner indicated in FIG. 5 and as hereinafter described. The front wheels 120 and 121, the latter not shown, are mounted on short axles which are pivoted to a cross member 124 that carries the weight of the front of the vehicle. The short axle 122 is pivotally mounted on the cross member 124 at 123, as shown in FIG. 5, and the right wheel is of course similarly symmetrically mounted on the opposite end of the beam 124, which is connected to the chassis in the manner about to be described. U-beams 125 and 126 are longitudinal members of the chassis frame. An additional U-beam 127 is integrally attached, as by welding, to these U-beams 125 and 126, and the inverted U-shaped member 128 is rigidly attached to the underside of the U-beam 127, as shown in FIG. 6. The inverted U-member 128 straddles the cross beam 124 and is pivoted thereto by means of a bolt 129. This one point suspension of the weight of the front of the vehicle distributes the load upon the two front wheels regardless of irregularities in the surface of the ground and the consequent variations in the relative levels of the supporting beam 124 and the supported chassis beam 127.

A rod 130 is pivotally attached to end 131 of the plunger of the steering cylinder 113. The short arm 132 is integral with the axle 122 and its outer end is pivoted at 133 to the rod link 130. The opposite end 131a of the plunger of the steering cylinder 133 is operatively connected to the right front wheel, but the specific construction and conections are not shown because they are obviously the symmetrical counterparts of those that have been described in connection with the left front wheel.

The steering cylinder 113 is connected to the U-beam 127 by a bracket 118. A rod 114 is pivoted to bracket 118 by means of a suitable bolt 119. Rod 114 is threaded and passes through the flange 115 on one end of the steering cylinder, and it is held in place by nuts 116 and 117 tightened against opposite sides of the flange 115.

Fluid under pressure for the cylinder 113 is received through tubes 134 and 135, FIGS. 5 and 7. These tubes, or extensions thereof, are connected to a four-way control valve 136, FIGS. 7, 14 and 15. This valve is operated by the manual lever 139 which moves link 140 longitudinally. Link 140 actuates link 141, which in turn moves the plunger 142 of the valve. When the steering arm 139 is moved in one direction, fluid under pressure that enters valve 136 through tube 137 leaves through tube 134 from whence it enters the power steering cylinder 113, FIGS. 7 and 5. This moves the plunger rods 131 and 131a in a direction that causes the wheels to turn to the right. Movement of lever 139 in an opposite direction results in the fluid leaving the four-way control valve through conduit 135 where the hydraulic pressure on the plunger is in a direction that causes the steering wheels to turn toward the left.

The inlet and outlet conduits for the power steering control valve 136 may be connected to the hydraulic system as shown in FIG. 7 where tube 137 is shown communicating with conduit 42, which obtains its flow from tube 41. Tube 41 is connected directly to the outlet port of the hydraulic pump 27. The fluid that is to return to the reservoir through tube 138 completes its return circuit through conduits 110, 99 and 100, which empties its contents directly into reservoir 19.

FIG. 8 shows the general hydraulic system of any of the four-way control valves hereinbefore described and the individual slave cylinder associated with each one. The value shown in FIG. 8 is indicated as being valve 136 operating the power steering cylinder 113, but it can equally well represent valves 43 or 69, which direct the flow of hydraulic power in a similar manner.

Inasmuch as it would be impossible to picture the continuous extent of each of the pipes and tubes from the hydraulic power unit 18, FIG. 2, to the control valves associated with seat 49 and from these valves to the various hydraulically-powered units controlled thereby, the complete hydraulic system can only be shown diagrammatically, as in FIG. 7, but the general course of some of the tubes has been indicated at 144 and 145 in FIG. 9 and by the broken tube ends on panel 50, in FIG. 1 as well as in FIG. 2, where additional broken-away fluid conduits are shown at 146.

FIG. 16 illustrates another embodiment of my invention especially adapted to such uses as picking fruit from adjoining trees. No seat is provided for the worker, as it contemplates that he will be standing or moving about. It comprises a platform 159 having an extension 147 that pivots on a horizontal axis like a single span bascule-type draw bridge. The extension tapers, as indicated in the figure, so that it is narrow enough for an appreciable portion of its length to permit such worker as may be supported thereby to work on two closely adjoining trees with the extension platform positioned between them. The extension portion of the platform may be pivoted by means of a trunnion-like structure located beneath the platform substantially at 148.

When the platform is positioned as shown in full lines in the figure, the weight of the worker near the end of the platform tends to move the center of gravity of the vehicle beyond the base of the four conventional supporting wheels. I therefore provide an extra wheel which is vertically retractable. When the worker is to use the extended platform, the extra wheel 149 should be lowered for contact with the ground as indicated. Otherwise, it may be raised by the hydraulic means hereinafter described. The axle for the wheel is suitably attached to the vertical depending member 150 of the extendable and adjustable horizontal beam 151. If beam 151 is shaped as shown in the figure, a rectangular tube or channel 152 is provided on the vertically movable box member 50a, a suitable opening (not shown) being provided in the box member 50a behind the tubular supporting guide 152 to permit the inner end of the extendable beam to move beyond the front vertical plane of the vertically movable member 50a. The horizontally extendable beam 151 is provided with a series of holes 155 which are so spaced therein that the removable pins 153 and 154 may be slipped through any pair of adjoining holes to lock the beam 151 in its selected adjusted position. The box channel or tube 152 should be pivotally connected to the box member 50a, as by a bracket 157' and a pivot pin; and a suitable spring should urge the mounting for the wheel downward to cause the wheel to yieldably engage the ground over which the wheel passes. Such a spring is illustratively indicated by a compression spring 156', confined in a housing 156 but attached at its upper end to the box member 50a and at its lower end to the box channel 152.

The chassis 1a of this species of my invention may be formed very much like the chassis for the previously described embodiment, and the power drives for forward and reverse motion as well as for the steering mechanism and the vertical movement of the platform may also be substantially like those described for the previously discussed species. The levers or others manual control members for the various valves may be placed, along with the valves themselves, in any position on the platform that may be readily accessible to the worker and yet out of his way as he moves about the platform. Two such controls are indicated at 157 supported by the platform near the center of the vehicle.

In this embodiment, the lift cylinder 56a for the worker's platform has been moved from the left side of the vehicle to the right side where it may be seen paralleling one of the uprights 169 of the superstructure 158 whose various vertical supports may be attached to the chassis in any suitable member, roughly as indicated in the figure. The centrally located portion 159 of the vertically movable platform is carried and supported by a flexible cable 159 passing over a pulley 160 suitably supported near the top of the superstructure 158. Cable 159 then proceeds toward the right side of the vehicle, to the reader's left, where it extends around a portion of pulley 161 rigidly attached to a shaft 162 journaled in two brackets 163 and 164 depending from a horizontal beam 165 at the top of the superstructure 158. After cable 159 leaves pulley 161, it proceeds downward and around pulley 170 where it reverses its direction and proceeds upwards for attachment to the platform 159 at point 171. Platform 159 with its extension 147 is moved up or down by the rotation of shaft 162 in the manner now to be described.

A drum 172 is appropriately keyed to the shaft 162 to assure its rotation with pulley 161. One end of cable 173 is secured to this drum and its other end is secured to the upper end of the plunger 55a of the lift cylinder 56a.

An additional hydraulic lift cylinder 174 that may have less capacity then the lift cylinder 56a, is provided for raising and lowering the box member 50a that carries the auxiliary supporting wheel 149. Suitable controls for cylinder 174 may of course be provided at any convenient location, either on the vertically movable platform or at such other place as the designer may think convenient. The additional lift cylinder and its control may appropriately be of the type indicated in FIG. 8, and the supply and return lines may be connected into the hydraulic system at such locations as the designer may prefer.

Guard rails 175 may be installed around the platforms for the protection of the worker.

If the vehicle is to be moved so as to position the retractable platform 147 between a different pair of adjoining trees, the worker may move back to the central portion of the platform 159 and then lift the platform drawbridge fashion as indicated in broken lines at 147. If convenience dictates, the auxiliary supporting wheel 149 may be raised up while the vehicle is moved to a location between two other trees, and the cantilevered beam 151 may be retracted if the lowered auxiliary wheel should be in line with anything that might interfere with the movement of the vehicle. After the equipment has been relocated so that the platform 147 may be interposed in a new position between adjoining trees, the extension end of the platform 147 may again be lowered for horizontal alignment with section 159 of the platform, and the retractable wheel may again be moved down for engagement with the ground with the position-retaining pins 153 and 154 in the same holes where they were previously located or in a different position-maintaining arrangement.

It should be noted that both of the illustrative embodiments hereinbefore described have been so designed that a large amount of space is available on the vehicle for transporting equipment of various kinds, supplies that may be required at a new location, empty crates, or other containers, boxes and containers that have been filled with harvested products, or even for the transportation of lumber which may be arranged longitudinally of the vehicle extending through such open spaces as are provided on the embodiment shown in FIG. 16, or in the previously described embodiment. A large amount of such space is available on the previously described vehicle between the chassis frame 1 and the frame 177 that supports the power unit 18 and parts of the fluid conduits between the power unit and the vertically movable box member 50. It should also be noted that the raising of the frame 177 above the level of the main chassis 1, results in shorter hose connections at 146 than if the power unit had been located either above or below a midposition of platform 77 between its two extremes of movement.

Various departures may of course be made from the illustrative embodiments hereinbefore described, and elements of the claimed combinations may be replaced by other parts performing the same or additional functions, and the components may be transposed or rearranged—all without departing from the broad spirit of my invention as succinctly set forth in the appended claims.

My claims are:

1. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support for a worker, and support carried by said chassis and mounted thereon for vertical reciprocal movement; a second power-driven means controllable from said support for turning the general plane of said steering wheels in either of two directions; a seat carried by said support; a forked lever pivotally mounted backward in response to the movement of said forked for applying power to said first power-driven means to move said vehicle forward in response to the movement of said forked lever in one direction and for moving it backward in response to the movement of said forked lever in an opposite direction and for automatically applying a braking action against either forward or backward movement when said power is removed; and means carried by said support for selectively moving said support in either of two opposite vertical directions under power and for applying a braking action against either upward or downward movement of said support when the power is removed therefrom.

2. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support for a worker, said support carried by said chassis and mounted thereon for vertical reciprocal movement; a seat carried by said support; a forked lever pivotally mounted beneath said seat; means controlled by said forked lever for applying power to move said support upward in response to the movement of said forked lever in one direction, and for applying power to move said support downward in response to the movement of said forked lever in an opposite direction, and for automatically applying a braking action against movement of said support either upward or downward upon movement of said forked lever to an intermediate position; a second power-driven means controllabe from said support for turning the general plane of said steering wheels in either of two directions; and control means carried by said support for reversing the direction of movement of said vehicle and for applying power to said first power-driven means to move the vehicle selectively forward or backward and for automatically applying a braking action against either forward or backward movement when said power is removed.

3. A vehicle for moving and positioning a worker; said vehicle comprising: a chassis; a first power-driven means for propelling said chassis selectively forward or backward and for supporting one end thereof; a pair of wheels for steering said chassis and supporting the other end thereof; a support for a worker, said support carried by said chassis and mounted thereon for vertical reciprocal movement; a seat carried by said support, a first and a second forked lever independently pivotally mounted beneath said seat; means controlled by said first forked lever for applying power to said first power-driven means to move said vehicle forward in response to the movement of said first lever in one direction and to move it backward in response to the movement of said first lever in the opposite direction and for automatically applying a braking action against either forward or backward movement when said power is removed; a second power-driven means controlled by said second forked lever for applying power to move said support upward in response to the movement of said second forked lever in one direction, and for applying power to move said support downward in response to the movement of said second forked lever in an opposite direction and for automatically applying a braking action against either upward or downward movement of said support when the power is removed; and a third power-driven means operable from said seat for turning the general plane of said steering wheels selectively in either of two directions and for automatically applying a braking action against the turning of said plane when said third power-driven means so operated that power is removed therefrom.

4. A vehicle for moving and positioning a worker, said vehicle comprising: a chassis, a first power-driven means for propelling said chassis selectively forward or backward and for supporting one end thereof; a pair of wheels for steering said chassis and supporting the other end thereof; a support for a worker, said support carried by said chassis and mounted thereon for vertical reciprocal movement; a second power-driven means controllable from said support for turning the general plane of said steering wheels in either of two directions; a seat carried by said support and mounted thereon for reciprocal movement at a right angle to the chassis' longitudinal axis of symmetry; a third power-driven means for selectively moving said support in either of two opposite vertical directions and for applying a braking action against all vertical movement of said support when the power is removed therefrom; a forked lever pivotally mounted beneath said seat; instrumentalities controlled by said forked lever for applying power to one of said power-driven means to move the element being driven thereby in one direction upon movement of said lever to one side of a neutral position and to move said element in an opposite direction upon movement of said lever to the other side of said neutral position and to apply a braking action against all movement of said driven element upon movement of said lever to said neutral position.

5. A vehicle for moving and positioning a worker, said vehicle comprising: a chassis; a first hydraulically powered means for propelling said chassis selectively forward or backward and for supporting one end thereof; a pair of wheels for steering said chassis and supporting the other end thereof; a second hydraulically powered means for turning the general plane of said steering wheels in either of two directions; a support for a worker, said support carried by said chassis and mounted thereon for vertical reciprocal movement; a third hydraulically powered means for selectively moving said support in either of two opposite vertical directions and for optionally applying a braking action against all vertical movement of said support; a reservoir of hydraulic fluid; a first fluid pump; tubular means for conducting fluid from said reservoir to said first pump; a first "four-way" valve having a first actuating member operable from said support, a fluid return connection to said reservoir, and a tube for receiving fluid under pressure from said first pump; a first pair of tubes so connecting said first valve to said first hydraulically powered means that said vehicle will be propelled forward upon movement of said first actuating member in one direction and backward upon movement of said first actuating means in an opposite direction; a second "four-way" valve having (a) a second actuating member operable from said support, (b) a fluid return connection to said reservoir, and (c) a tube for receiving fluid under pressure from said pump; a second pair of tubes so connecting said second valve to said second hydraulically powered means that the general plane of said steering wheels will turn toward a first course upon movement of said second actuator in one direction and toward an opposite course upon movement of said second actuator in an opposite direction; a second pump and a third "four-way" valve having (a) a third actuating member operable from said support, (b) a fluid return connection to said reservoir and (c) a tube for receiving fluid under pressure from said second pump; and a third pair of tubes so connecting said third valve to said third hydraulically powered means that said support will move upward upon movement of said third actuating member in one direction and downward upon movement of said third actuating member in the opposite direction.

6. A vehicle for moving and positioning a worker, said vehicle comprising: a chasis; a first hydraulically powered means for propelling said chassis selectively forward or backward and for supporting one end thereof; a pair of wheels for steering said chassis and supporting a second hydraulically powered means for turning the general plane of said steering wheels in either of two directions; a support for a worker, said support carried by said chassis and mounted thereon for vertical reciprocal movement; a third hydraulically powered means for selectively moving said support in either of two opposite vertical directions and for optionally applying a braking action against all vertical movement of said support; a reservoir of hydraulic fluid; hydraulic pumping means comprising a first and a second pump; fluid conducting means for conducting fluid from said reservoir to both of said pumps; a first "four-way" valve having (a) a first actuating member operable from said support, (b) a fluid return connection to said reservoir; and (c) a conduit for receiving fluid under pressure from said first pump; a first pair of tubes so connecting said first valve to said first hydraulically powered means that said vehicle will be propelled forward upon movement of said first actuating member in one direction and backward upon movement of said first actuating member in an opposite direction; a second "four-way" valve having (a) a second actuating member operable from said support, (b) a fluid return connection to said reservoir, and (c) a tube for receiving fluid under pressure from said hydraulic pumping means; a second pair of tubes so connecting said second valve to said second hydraulically powered means that the general plane of said steering wheels will turn toward a first course upon movement of said second actuator in one direction and toward an opposite course upon movement of said second actuator in an opposite direction; and a third "four-way" valve having (a) a third actuating member operable from said support, (b) a fluid return connection to said reservoir, and (c) a tube for receiving fluid under pressure from said second pump; a directional valve having (a) a tubular connection to said second pump for receiving fluid under pressure therefrom, (b) a pair of outlet tubes one of which is connected to said conduit, and (c) a control member acting in a first control position thereof to direct the fluid from said directional valve through the outlet tube connected to said conduit for increasing the fluid flow through said first hydraulically powered means, thus speeding the movement of the vehicle, and said control member acting in a second control position thereof to direct the fluid passing through said directional valve into the other outlet tube; and a third pair of tubes so connecting said third valve to said third hydraulically powered means that said support will move upward upon movement of said third actuating member in one direction and downward upon movement of said third actuating member in the opposite direction.

7. A vehicle for moving and positioning a worker, said vehicle comprising: a chassis; a first means for propelling said vehicle forward and backward and for supporting one end thereof, said means comprising: a fluid motor; a pair of wheels for steering said chassis and supporting the other end thereof; a platform mounted on said chassis for vertical reciprocal movement; a swiveled seat mounted on said platform; a fluid reservoir mounted on said chassis; hydraulic pumping means having a connection to said reservoir for receiving fluid therefrom; a first "four-way" valve connected to receive fluid under pressure from said hydraulic pumping means, said first "four-way" valve having a first control member; a pair of hydraulic tubes each independently operatively interposed between said first valve and said fluid motor and so connected thereto that fluid will flow through said motor and hydraulic tubes in one direction when said first control member is in a first operative position and through said motor and hydraulic tubes in an opposite direction when said first control member is in a second operative position; a hydraulic jack for raising said platform; a second "four-way" valve connected to receive fluid under pressure from said hydraulic pumping means, said second "four-way" valve having a second control member; at least one of said four-way valves mounted on the underside of said swivel seat; and a forked lever pivoted beneath said seat for operating the control member of the valve mounted on the underside of said seat.

8. A vehicle for moving and positioning a worker, said vehicle comprising: a chassis; a first means for propelling said vehicle forward and backward and for supporting one end thereof, said means including a fluid motor; a pair of wheels for steering said chassis and supporting the other end thereof; a platform mounted on said chassis for vertical reciprocal movement; a swiveled seat mounted on said platform; a fluid reservoir mounted on said chassis; hydraulic pumping means having a connection to said reservoir for receiving fluid therefrom; a first four-way valve mounted on the underside of said seat and connected to receive fluid under pressure from said hydraulic pumping means, said first four-way valve having a first control member; a pair of hydraulic tubes each independently operatively interposed between said first valve and said fluid motor and so connected thereto that fluid will flow through said motor and hydraulic tubes in one direction when said first control member is in a first operative position and through said motor and hydraulic tubes in an opposite direction when said first control member is in a second operative position; a hydraulic jack for raising said platform; a second four-way valve mounted on the underside of said seat; and first and second forked levers independently mounted on the underside of said seat and individually operatively connected to said first and second control members respectively, said levers so positioned with respect to said seat that a person occupying said seat may place the lower portions of his legs respectively between the forked ends of the levers for operating the same.

9. A vehicle for moving and positioning a worker, said vehicle comprising: a chassis; a first means for propelling said vehicle forward and backward and for supporting one end thereof, said means comprising a fluid motor; a pair of wheels for steering said chassis and supporting the other end thereof; a platform mounted on said chassis for vertical reciprocal movement; a swiveled seat mounted on said platform; a fluid reservoir mounted on said chassis; hydraulic pumping means having a connection to said reservoir for receiving fluid therefrom; a first four-way valve mounted on the underside of said seat and connected to receive fluid under pressure from said hydraulic pumping means, said first four-way valve having a first control member; a pair of hydraulic tubes each independently operatively interposed between said first valve and said fluid motor and so connected thereto that fluid will flow through said motor and hydraulic tubes in one direction when said first control member is in a first operative position and through said motor and hydraulic tubes in an opposite direction when said first control member is in a second operative position; a hydraulic jack for raising said platform; a second four-way valve mounted on the underside of said seat; a hydraulic steering mechanism operatively connected to said pair of wheels; and a control valve for said hydraulic steering mechanism having a third control member and connected to receive fluid under pressure from said pumping means, said valve so connected hydraulically to said steering mechanism that the general planes of the wheels of said pair will be turned in one direction in response to the movement of said third control member to one side of a neutral position and in an opposite direction in response to the movement of said third control member to the opposite side of said neutral position, said third member operable from said seat.

10. A vehicle for moving and positioning a worker, said vehicle comprising: a chassis; a first means for propelling said vehicle forward and backward and for supporting one end thereof, said means comprising a fluid motor; a pair of wheels for steering said chassis and supporting the other end thereof; a platform mounted on said chassis for vertical reciprocal movement; a swiveled seat mounted on said platform; a fluid reservoir mounted on said chassis; hydraulic pumping means having a connection to said reservoir for receiving fluid therefrom; a first four-way valve mounted on the underside of said seat and connected to receive fluid under pressure from said hydraulic pumping means, said first four-way valve having a first control member; a pair of hydraulic tubes each independently operatively interposed between said first valve and said fluid motor and so connected thereto that fluid will flow through said motor and hydraulic tubes in one direction when said first control member is in a first operative position and through said motor and hydraulic tubes in an opposite direction when said first control member is in a second operative position; a hydraulic jack for raising said platform; a second four-way valve mounted on the underside of said seat; a hydraulic steering mechanism operatively connected to said pair of wheels; a control valve for said hydraulic steering mechanism having a third control member and connected to receive fluid under pressure from said pumping means, said valve mounted on the underside of said seat; an operating arm connected to said third control member for moving the same, said operating arm extending upward beyond the general plane of the seat for easy availability to the person occupying said seat; and first and second forked levers independently mounted on the underside of said seat and individually operatively connected to said first and second control members respectively, said levers so positioned with respect to said seat that said person while occupying said seat may place the lower portions of his legs respectively between the forked ends of said levers.

11. A vehicle for moving and positioning a worker, said vehicle comprising: a chassis; a first hydraulically powered means for propelling said chassis selectively forward or backward and for supporting one end thereof; a pair of wheels for steering said chassis and supporting the other end thereof; a second hydraulically powered means for turning the general plane of said steering wheels in either of two directions; a support for a worker said support carried by said chassis and mounted thereon for vertical reciprocal movement; a third hydraulically powered means for selectively moving said support in either of two opposite vertical directions and for automatically applying a braking action against all vertical movement of said support when the hydraulic power is removed; a platform mounted on said chassis and spaced therefrom to a vertical position intermediate the extreme possible positions of said support; a reservoir of hydraulic fluid mounted on said platfiorm; fluid pumping means mounted on said platform; tubular means for conducting fluid from said reservoir to said pumping means; a first "four-way" valve mounted on said support and having (a) a first actuating member, (b) a flexible fluid return connection to said reservoir, and (c) a flexible tube for receiving fluid under pressure from said pumping means; a first pair of tubes so connecting said first valve to said hydraulically powered means that said vehicle will be propelled forward upon movement of said first actuating member in one direction and backward upon movement of said first actuating member in an opposite direction; a second four-way valve mounted on said support and having (a) a second actuating member, (b) a flexible fluid return to said reservoir, and (c) a flexible tube for receiving fluid under pressure from said pump; a second pair of tubes so connecting said second valve to said second hydraulically powered means that the general plane of said steering wheels will turn toward a first course upon movement of said second actuator in one direction and toward an opposite course upon movement of said second actuator in an opposite direction; and a third four-way valve having (a) a third actuating member operable from said support, (b) a fluid return connection to said reservoir, and (c) a tube for receiving fluid under pressure from said pumping means; and a third pair of tubes so connecting said third valve to said third hydraulically powered means that said support will move upward upon movement of said third actuating member to one side of an intermediate position, downward upon movement of said third actuating member to the opposite side of said intermediate position, and remain immobilized against movement in either direction upon return of said third actuating member to said intermediate position.

12. A vehicle for moving and positioning a worker, said vehicle comprising: a chassis; a first hydraulically powered means for propelling said chassis selectively forward or backward and for supporting one end thereof; a pair of wheels for steering said chassis and supporting the other end thereof; a second hydraulically powered means for turning the general plane of said steering wheels in either of two directions; a support for a worker, said support carried by said chassis and mounted thereon for vertical reciprocal movement; a third hydraulically powered means for selectively moving said support in either of two opposite vertical directions and for optionally applying a braking action against all vertical movement of said support; a platform mounted on said chassis and spaced therefrom to a vertical position intermediate the extreme possible positions of said support; a detachable hydraulic power unit including: a base, a reservoir for hydraulic fluid, said reservoir supported by and spaced above said base, first and second hydraulic pumps mounted on said base beneath said reservoir, an internal combustion engine mounted on said base beneath said reservoir and operatively connected to the shafts of said pumps for driving the same, a filter at least indirectly supported by said base and connected to said reservoir for receiving fluid therefrom, a first tube connecting said filter to the intake port of said first pump, a second tube at least indirectly supported by said base and having one end connected to the outlet port of said first pump; a first matable part of a first severable tube connector attached to the other end of said second tube, a third tube at least indirectly supported by said base and having one end opening into said reservoir, a second matable part of a second severable tube connector attached to said third tube, a fourth tube connecting said filter to the intake port of said second pump, a fifth tube at least indirectly supported by said base and having one end connected to the outlet port of said second pump, a third matable part of a third severable tube connector attached to the other end of said fifth tube, a sixth tube at least indirectly supported by said base and having one end opening into said reservoir, a fourth matable part of a fourth severable tube connector attached to the other end of said sixth tube; a first four-way valve mounted on said support and having (a) a first actuating member, (b) a flexible fluid return terminating in a fifth matable part of a severable connector, said fifth matable part connected to the second matable part forming a component of said hydraulic power unit, and (c) a flexible tube terminating in a sixth matable part of a severable connector, said sixth matable part connected to said first matable part of said hydraulic power unit; a second pair of tubes so connecting said first valve to said hydraulically powered means that said vehicle will be propelled forward upon movement of said first actuating member in one direction and backward upon movement of said first actuating member in an opposite direction; and a second four-way valve mounted on said support and having (a) a second actuating member, (b) a flexible tube terminating in a seventh matable part of a separable connector, said seventh matable part connected to the third matable part forming a component of said hydraulic power unit, and (c) a tube terminating in an eighth matable part, said eighth matable part connected to the fourth matable part of said hydraulic power unit.

13. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support carried by said chassis and mounted thereon for vertical reciprocal movement; a carriage mounted on said support for rectilinear horizontal movement transversely of said vehicle's longitudinal axis of symmetry; means for locking said carriage in various positions within its range of horizontal movement; a seat for a worker mounted on said carriage; control means carried by said support for applying power to said first power-driven means to move the vehicle selectively forward or backward and for automatically applying a braking action when said power is removed; a second power-driven means controllable from said support for turning the general plane of said steering wheels in either of two directions; and means controllable from said support for moving said support in either of two opposite vertical directions under power and for applying a braking action against all vertical movement of said support when the power is removed therefrom.

14. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support carried by said chassis and mounted thereon for vertical reciprocal movement; a platform superimposed over said support and connected thereto at the side of said platform nearest the vehicle's longitudinal axis of symmetry; means for leveling said platform, said leveling means operatively interposed between said support and said platform near the side of said platform furthest from said axis of symmetry; a seat for a worker mounted on said platform; control means carried by said support for applying power to said first power-driven means to move the vehicle selectively forward or backward and for automatically applying a braking action when said power is removed; a second power-driven means controllable from said support for turning the general plane of said steering wheels in either of two directions; and means controllable from said support for moving said support in either of two opposite vertical directions under power and for applying a braking action against all vertical movement of said support when the power is removed therefrom.

15. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support carried by said chassis and mounted thereon for vertical reciprocal movement; a carriage mounted on said support for rectilinear horizontal movement transversely of said vehicle's longitudinal axis of symmetry; a superstructure for carrying a receptacle, said superstructure mounted on said support at one side of said carriage; a seat for a worker mounted on said carriage; control means carried by said support for applying power to said first power-driven means to move the vehicle selectively forward or backward and for automatically applying a braking action when said power is removed; a second power-driven means controllable from said support for turning the general plane of said steering wheels in either of two directions; and means controllable from said support for moving said support in either of two opposite vertical directions under power and for applying a braking action against all vertical movement of said support when the power is removed therefrom.

16. A vehicle for moving and positioning a worker, said vehicle comprising: a chassis; a first power-driven means for propelling said chassis selectively forward or backward and for supporting one end thereof; a pair of wheels for steering said chassis and supporting the other end thereof; a support carried by said chassis and mounted thereon for vertical reciprocal movement; an elongated platform for a worker, said platform hinged at one end thereof to said support for upward angular movement therefrom but normally extending horizontally from said support therefrom in a direction away from said vehicle's longitudinal axis of symmetry, said platform being narrower at its free end than at its hinged end and having a railing around a portion thereof; control means carried by said support for applying power to said first power-driven means to move the vehicle selectively forward or backward and for automatically applying a braking action when said power is removed; a second power-driven means controllable from said support for turning the general plane of said steering wheels in either of two directions; and means controllable from said support for moving said support in either of two opposite vertical directions under power and for applying a braking action against all vertical movement of said support when the power is removed therefrom.

References Cited by the Examiner
UNITED STATES PATENTS

| | | | |
|---|---|---|---|
| 1,905,626 | 4/1933 | Hershey | 182—148 X |
| 2,384,447 | 9/1945 | Baldwin | 180—66 |
| 2,745,506 | 5/1956 | McCallum | 180—66 |
| 2,938,595 | 5/1960 | Miller | 182—131 X |
| 2,970,667 | 2/1961 | Bercaw | 182—13 |
| 2,989,140 | 6/1961 | Hill | 182—63 |
| 3,016,973 | 1/1962 | Williamson | 182—163 X |
| 3,034,668 | 5/1962 | Wicks | 214—83.1 |
| 3,095,945 | 7/1963 | Mitchell | 182—63 X |
| 3,129,786 | 4/1964 | Hiyama | 182—63 |
| 3,161,259 | 12/1964 | Wilson | 182—141 |

HARRISON R. MOSELEY, *Primary Examiner.*
REINALDO P. MACHADO, *Examiner.*